Jan. 9, 1951          A. M. WATSON          2,537,725

PICNIC BASKET

Filed Dec. 16, 1949

*INVENTOR.*
AUDLIN M. WATSON
BY
*ATTORNEY*

Patented Jan. 9, 1951

2,537,725

UNITED STATES PATENT OFFICE 2,537,725

PICNIC BASKET

Audlin M. Watson, Camden, Mich.

Application December 16, 1949, Serial No. 133,263

4 Claims. (Cl. 217—122)

This invention relates to improvements in a picnic basket in which is provided a division board and means for supporting it in a basket structure suitably in various positions therein as desired.

Various structures have been devised wherein divisional boards have been arranged in containers by which the boards are sustained at definite levels in the containers.

In the instant invention, one of the objects thereof is to provide a divisional partition and supports therefor, adjustably positioned in the walls of the container for sustaining the board therein at selected levels, dependent upon arrangement of the supports in connection with the walls of the container.

Another object of the invention is to provide adjustable stops in connection with the walls of the basket to support the divisional partition at selective levels therein, and which may be readjusted relatively to the walls of the container by which to vary the elevation of the divisional board.

Other objects and advantages of the invention appear in the following description.

An illustrative embodiment of the invention is shown in the accompanying drawings, in which.

Figure 1:
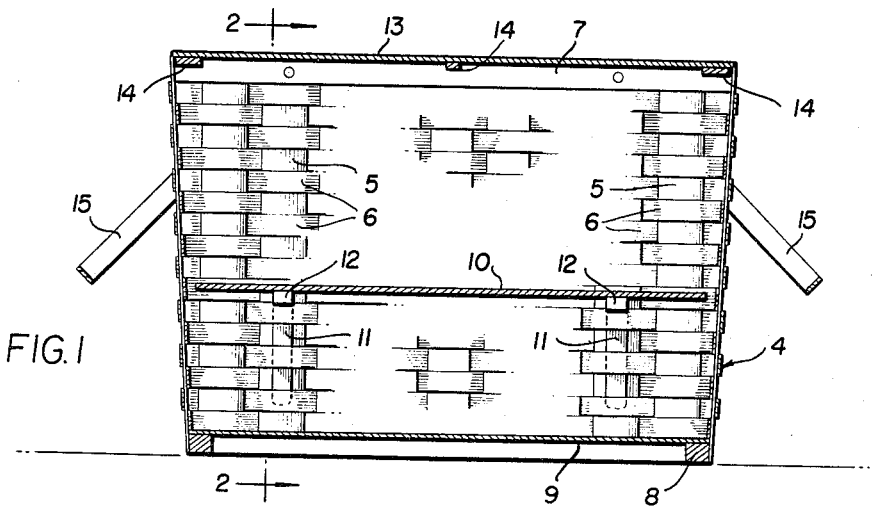
Fig. 1 is a vertical central section extending lengthwise through a structure in which the invention is incorporated.
Figure 2:
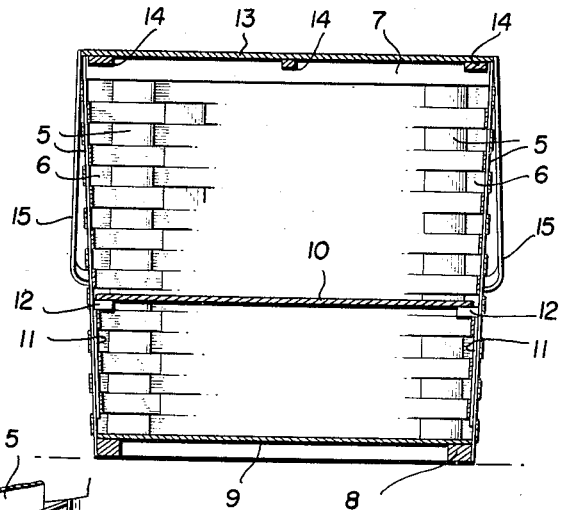
Fig. 2 is a transverse central section of the structure shown in Fig. 1.
Figure 3:
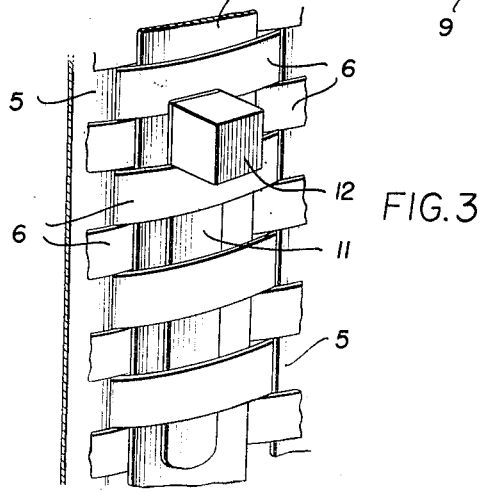
Fig. 3 is a fragmentary perspective view of the interior wall of a container or basket, including one of the adjustable supports for a divisional partition used in the invention.

The illustrative embodiment of the invention consists of a basket 4 preferably made up of thin vertical and horizontal interwoven wooden strips 5 and 6 respectively, that form the walls of the basket. Around the top of the walls is provided a rim 7, and a base 8 is arranged in connection with the lower ends of the walls beneath the bottom 9 of the basket.

One of the features of the invention is the provision of supports for a horizontal divisional partition 10 which is adapted to be positioned within the basket at selected levels as may be desired. Said supports each consist of a thin blade 11 having on its upper end portion a head-block 12 that extends inwardly from the adjacent wall of the basket when the blade is inserted between the woven strips that form the walls of the basket and constitutes a rest for the divisional partition. The supports are adapted to be inserted into the basket walls selectively at different heights with their head-blocks overhanging the next lower adjacent horizontal strip which prevents downward movement of the supports in the basket. The divisional partition rests upon the head-blocks and is sustained at a definite height in the basket when positioned on the head-blocks at a corresponding level.

The top of the basket is provided with a lid 13 on the bottom face of which are secured a series of stops 14 adjacent the ends and sides thereof which bear against the inner wall of the rim 7 of the basket when the lid is pressed into place, and there are provided foldable handles 15 that are pivotally connected to the rim of the basket as is usual in basketry practice.

In use, the supports are positioned within the basket by inserting their blades 11 between the woven strips of the walls thereof uniformly at a selected level. The basket is then partially filled with articles to be carried up to approximately the level of the head-blocks previously arranged in place. The divisional partition is then laid upon the head-blocks upon which it receives support, and then the basket is filled with other material which rests upon the divisional partition which is confined therein when the lid is placed in position on the rim.

Additional supports may be arranged in connection with the walls of the basket for the support of other divisional partitions as may be required.

By this arrangement various articles of food or other material are packed in the basket without becoming crushed.

Variations from the particular construction above disclosed may be resorted to by the exercise of skill in the art, without departure from the spirit or scope of the invention.

What I claim is:

1. A container for foodstuffs consisting of a basket having walls formed of interwoven vertical and horizontal wooden strips, supporting members having blades insertable adjustably in the woven strips of the walls of the basket in selected positions and provided with head-blocks that extend inwardly from said walls, a divisional partition removably disposed within the basket seated on said head-blocks whereby to be sustained in said selected positions, and a lid for closing the basket disposed on the top thereof provided with stops engaging the rim of the basket to hold said lid centered thereon.

2. A basket having walls of interwoven wooden strips, supporting members having blades insertable adjustably in the woven strips in selected positions provided with inwardly extending head-blocks, a divisional partition disposed removably within the basket seated on the head-blocks, and a lid closing the top of the basket.

3. A basket having side and end walls formed of interwoven strips, supporting members provided with blades insertable in the weave of said walls adjustably at selected levels and having inwardly projecting head-blocks, and a divisional partition disposed within the basket seated on said head-blocks.

4. A basket having woven walls provided with a series of members adjustably secured at selected levels in the weave of the walls of the basket, said members having head-blocks that extend inwardly with respect to the basket adapted to support a divisional partition when seated thereon.

AUDLIN M. WATSON.

REFERENCES CITED

The following references are of record in the file of this patent:

UNITED STATES PATENTS

| Number | Name | Date |
| --- | --- | --- |
| 1,880,461 | Moyes | Oct. 4, 1932 |
| 2,197,842 | Sothras | Apr. 23, 1940 |

FOREIGN PATENTS

| Number | Country | Date |
| --- | --- | --- |
| 609,898 | France | May 22, 1926 |